(12) United States Patent
Goodman et al.

(10) Patent No.: US 8,813,134 B2
(45) Date of Patent: Aug. 19, 2014

(54) MOBILE DEVICE CALLER ID TO SMART TV DEVICES

(71) Applicant: Verizon Patent and Licensing Inc., Basking Ridge, NJ (US)

(72) Inventors: Lee N. Goodman, Tyngsboro, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/722,417

(22) Filed: Dec. 20, 2012

(65) Prior Publication Data

US 2014/0181886 A1  Jun. 26, 2014

(51) Int. Cl.
*H04N 7/16* (2011.01)

(52) U.S. Cl.
USPC .............. 725/62; 725/133; 725/141; 725/153

(58) Field of Classification Search
USPC .................................. 725/62, 133, 141, 153
See application file for complete search history.

(56) References Cited

U.S. PATENT DOCUMENTS

2007/0245384 A1* 10/2007 Walter et al. ..................... 725/62
2008/0016526 A1*  1/2008 Asmussen ....................... 725/34

* cited by examiner

*Primary Examiner* — Hunter B Lonsberry

(57) ABSTRACT

A method, performed by a mobile communication device, may include detecting a smart television device. The method may further include receiving an incoming telephone call, wherein the incoming telephone call includes caller identification information; providing the caller identification information to the smart television device; receiving an instruction on how to process the incoming call from the smart television device; and processing the incoming telephone call based on the received instruction.

20 Claims, 12 Drawing Sheets

US 8,813,134 B2

MOBILE DEVICE CALLER ID TO SMART TV DEVICES

BACKGROUND INFORMATION

Caller identification (ID) service may be provided to users of mobile communication devices. Thus, when a first user receives a telephone call from a second user, the second user's identification information, such as the name and phone number of the second user, may be displayed on the first user's mobile communication device while a ringing signal is being played, or while the telephone call is being set up by the network and before the call is answered. The caller ID information for a telephone number may be obtained from a caller ID database, which may be available to providers of mobile communication services.

DETAILED DESCRIPTION OF PREFERRED EMBODIMENTS

Figure 1:
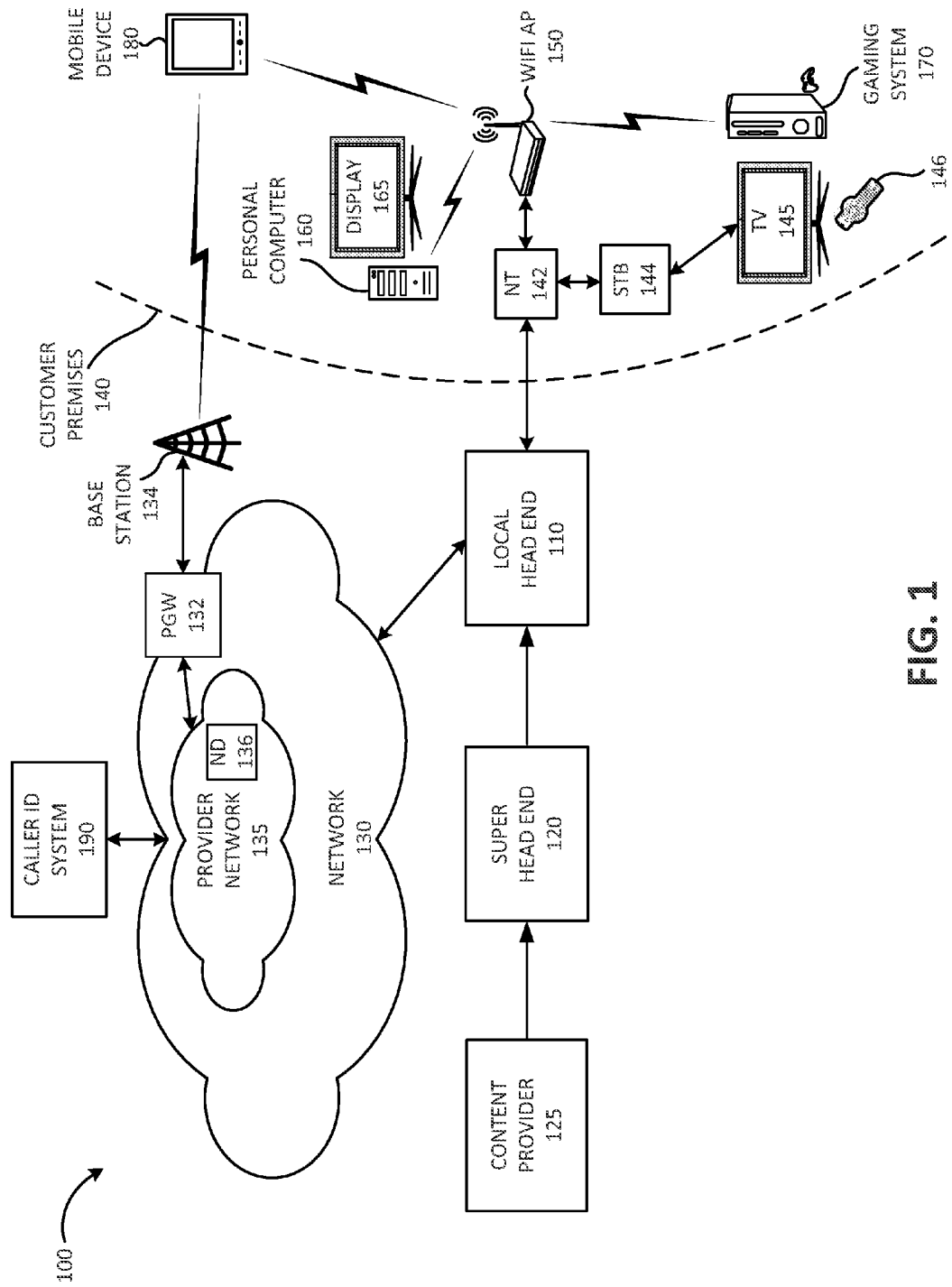
FIG. 1 is a diagram illustrating an exemplary environment according to an implementation described herein.

The following detailed description refers to the accompanying drawings. The same reference numbers in different drawings identify the same or similar elements.

An implementation described herein relates to providing mobile device caller identification (ID) information to a smart television (TV) device and enabling the smart TV device to process an incoming call based on the caller ID information. A smart TV device may refer to any electronic device that is configured to support add-on applications and that is configured to communicate with other electronic devices. A smart TV device, as the term is used herein, may include a set-top box, a television, a gaming system, a personal computer (e.g., a desktop computer, a laptop computer, a tablet computer, etc.), and/or another type of media playing device.

A mobile device may be paired with a smart TV device, located on a customer's premises, when the mobile device is brought by the customer onto the customer premises. The mobile device may advertise a caller ID application that is configured to communicate with a smart TV device and a smart TV device may respond and request to pair with the mobile device. In some implementations, the mobile device and the smart TV device may pair locally, using, for example, a WiFi access point or a Bluetooth connection. In other implementations, the mobile device and the smart TV device may pair via a server device. For example, a mobile device may pair with a set-top box via a local head end associated with the set-top box.

Caller ID information for an incoming call to the mobile device may be provided to the smart TV device. In some implementations, the caller ID information may be provided by the mobile device. For example, the mobile device may receive the caller ID information along with the incoming call and may provide the caller ID information to the smart TV device via a local connection (e.g., a WiFi connection, a Bluetooth connection, near field communication (NFC) connection, etc.). In other implementations, the caller ID information may be provided to the smart TV device by a network device. For example, a mobile device may inform the network device (e.g., a Call Session Control Function (CSCF) device of an Internet Protocol (IP) Multimedia Subsystem (IMS)) that the mobile device has been paired with a smart TV device and, in response, the network device may provide caller ID information to the smart TV device when an incoming call to the mobile device is received.

The caller ID information may be displayed by the smart TV device to the user and the user may be provided with one or more options on how to respond to the incoming call via the smart TV device. For example, the user may be given an option to ignore the call or to answer the call. If the user selects to answer the call, the user may be given the option of either handing the call over to the smart TV device or of streaming the audio from the call from the mobile device to the smart TV device.

FIG. 1 is a diagram illustrating an exemplary environment 100 according to an implementation described herein. As shown in FIG. 1, environment 100 may include a local head end 110, a super head end 120, a content provider 125, a network 130, a customer premises 140, a mobile device 180, and a caller ID system 190. While FIG. 1 depicts a single local head end 110, a single super head end 120, a single content provider 125, a single network 130, a single customer premises 140, and a single mobile device 180 for illustrative purposes, in practice, environment 100 may include multiple local head ends 110, multiple super head ends 120, multiple content providers 125, multiple networks 130, multiple customer premises 140, and/or multiple mobile devices 180.

Local head end 110 may include one or more devices, such as server devices, that ingest content, store content, format content, and/or deliver content to customer premises 140 and/or to mobile device 180. For example, local head end 110 may provide television channels, including advertisements, to customer premises 140. Furthermore, local head end 110 may receive requests for content from customer premises 140. While local head end 110 is illustrated in FIG. 1 as connecting to a single customer premises 140 for explanatory purposes, in practice, local head end 110 may connect to multiple customer premises 140 (and/or to multiple mobile devices 180). For example, local head end 110 may deliver content to customer premises 140 located within a particular geographic area. Furthermore, local head end 110 may provide Internet access to customer premises 140 by enabling network terminal 142 to communicate with network 130.

Super head end 120 may include one or more devices, such as server devices, that ingest content, store content, format content, and/or deliver content to local head end 110. For example, super head end 120 may ingest content from content providers 125 at a national (and/or multi-region level) and provide the ingested content to one or more local head ends 110.

Content provider 125 may include one or more devices, such as server devices, that provide content to super head end 120. For example, content provider 125 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 125 may also include on-demand content providers (e.g., video on demand (VOD), pay per view (PPV), etc.).

Network 130 may enable local head end 110, customer premises 140, caller ID system 190, and/or mobile device 180 to communicate with each other. Network 130 may include one or more wired and/or wireless networks. For example, network 130 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 130 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks. Network 130 may include a packet data network gateway (PGW) 132, a base station 134, and a provider network 135.

PGW 132 may function as a gateway with respect to mobile device 180 and may, for example, assign an IP address to mobile device 180. Base station 134 may enable mobile device 180 to communicate with PGW 132 using wireless signals. PGW 132 and base station 134 may be part of a wireless access network, such as Code Division Multiple Access (CDMA) wireless access network, a Global System for Mobile Communications (GSM) wireless access network, a Long Term Evolution (LTE) wireless access network, and/or another type of wireless access network.

Provider network 135 may include a network that may provide voice communication services to mobile device 180. As an example, if PGW 132 and base station 134 are associated with an LTE wireless access network, provider network 135 may include an IMS network. As another example, if PGW 132 and base station 134 are associated with a CDMA or GSM network, provider network 135 may include a circuit switched network. Provider network 135 may include a network device (ND) 136.

Network device 136 may handle call set up for voice calls to and/or from mobile device 180. For example, if provider network 135 includes an IMS network, network device 136 may include a CSCF device. Furthermore, network device 136 may obtain caller ID information from caller ID system 190 and may provide the caller ID information to mobile device 180. Network device 136 may also provide caller ID information to local head end 110, if mobile device 180 is paired with a device located at customer premises 140.

Customer premises 140 may include a particular location (or multiple locations) associated with a customer. For example, customer premises 140 may include the customer's home. Devices associated with customer premises 140 may receive content, such as video content, via local head end 110 and/or may receive content, or communicate with other devices, via network 130. Devices associated with customer premises 140, as well as mobile device 180, may be considered "user devices" and/or "network devices." Customer premises 140 may include a network terminal (NT) 142, a set top box (STB) 144, a television 145, a remote control 146, a WiFi access point (AP) 150, a personal computer 160, a display 165, and a gaming system 170. Mobile device 180 may also be located within customer premises 140 at particular times.

NT 142 may receive content from local head end 110 via a connection, such as, for example, via a fiber optic cable connection, a coaxial cable connection, a wireless connection, and/or another type of connection. Furthermore, NT 142 may send information from a device associated with customer premises 140 to local head end 110. In one implementation, NT 142 may include an optical network terminal and NT 142 and local head end 110 may form part of a high-speed fiber optic network (e.g., FiOS™). In another implementation, NT 142 may include a cable modem. In yet another implementation, NT 142 may include a fixed wireless transceiver. Additionally or alternatively, NT 142 may include a layer 2 and/or layer 3 network device, such as a switch, router, firewall, and/or gateway. Customer premises 140 may receive one or more services via the connection between NT 142 and local head end 110, such as, for example, a television service, Internet service, and/or voice communication (e.g., telephone) service.

STB 144 may receive content and output the content to television 145 for display. STB 144 may include a component (e.g., a cable card or a software application) that interfaces with (e.g., plugs into) a host device (e.g., a personal computer, television 145, a stereo system, etc.) and allows the host device to display content. STB 144 may also be implemented as a home theater personal computer (HTPC), an optical disk player (e.g., digital video disk (DVD) or Blu-Ray™ disc player), a cable card, etc. STB 144 may receive commands and/or other type of data from other devices, such as remote control 146, and may transmit the data to other devices in environment 100, such as, for example, network device 136.

Television 145 may output content received from STB 144. Television 145 may include speakers as well as a display. Remote control 146 may issue wired or wireless commands for controlling other electronic devices, such as television 145 and/or STB 144. Remote control 146, in conjunction with STB 144, may allow a customer to interact with an application running on STB 144, such as a caller ID application. Other types of devices (e.g., a keyboard, mouse, mobile phone, etc.) may be used instead of, or in addition to, remote control 146, in order to control television 145 and/or STB 144.

WiFi AP 150 may include a device that allows devices to wirelessly communicate with NT 142, and/or with each other, using a WiFi connection and/or another type of wireless connection (e.g., a Bluetooth connection, a NFC connection, etc.). Personal computer 160 may include a desktop computer, a laptop computer, a tablet computer, a mobile communication device, a personal digital assistant (PDA), or another type of computation and/or communication device. Personal computer 160 may include a microphone to capture audio, a camera to capture images or video. Personal computer 160 may include display 165 for displaying images and/or video content received from local head end 110 via NT 142. Personal computer 160 may also include a speaker for playing audio signals.

Gaming system 170 may include one or more video game consoles configured to run video games. Gaming system 170 may communicate with NT 142 either directly or via WiFi AP 150 and may be configured to communicate with other devices via network 130 (e.g., using IP). Gaming system 170 may include a gaming controller. Furthermore, gaming system 170 may include a microphone for receiving audio input and may include speaker for outputting audio signals. Additionally or alternatively, gaming system 170 may be connected to TV 145 directly, via WiFi AP 150, via a Bluetooth connection, and/or via a NFC connection and may output audio signals via TV 145.

Mobile device 180 may include a mobile communication device, such as a mobile phone, a smart phone, a tablet computer, a laptop, a PDA, or another type of portable communication device. Mobile device 180 may communicate with provider network 135 via base station 134 and PGW 132. Furthermore, mobile device 180 may communicate with devices in customer premises 140 via WiFi AP 150 or via a Bluetooth connection (not shown in FIG. 1). In some embodiments, mobile device 180 may be associated with a customer account associated with NT 142. In other embodiments, mobile device 160 need not be associated with NT 142. Mobile device 180 may include a caller ID application configured to identify a smart TV device and to pair with the smart TV device. The caller ID application may provide caller ID information to the smart TV device and may receive instructions on how to process an incoming call from the smart TV device. Devices in customer premises 140 which may correspond to a smart TV device may include STB 144, TV 145, personal computer 160, and/or gaming system 170.

Caller ID system 190 may include one or more devices, such as server devices, that determine caller ID information for a particular call. For example, caller ID system 190 may maintain a database that relates mobile device identifiers to subscriber information, such as a subscriber name. A mobile device identifier may include a Mobile Subscriber Integrated Services Digital Network number (MSISDN), an International Mobile Subscriber Identity amp number, a mobile identification number (MIN), an International Mobile Equipment Identifier (IMEI), an Integrated Circuit Card Identifier (ICCI), and/or any other mobile device identifier. Network device 136 of provider network 135 may request caller ID information from caller ID system 190 for a particular call using the initiating party's mobile device identifier and may receive caller ID information, such as subscriber information, and/or additional mobile device identifiers, associated with the initiating party's mobile device identifier, from caller ID system 190. The subscriber information and/or one or more mobile device identifiers (e.g., a name and a telephone number) may be provided as caller ID information by network device 136 to mobile device 180 and/or to one or more smart TV devices paired with mobile device 180 (e.g., STB 144, television 145, personal computer 160, and/or gaming system 170).

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
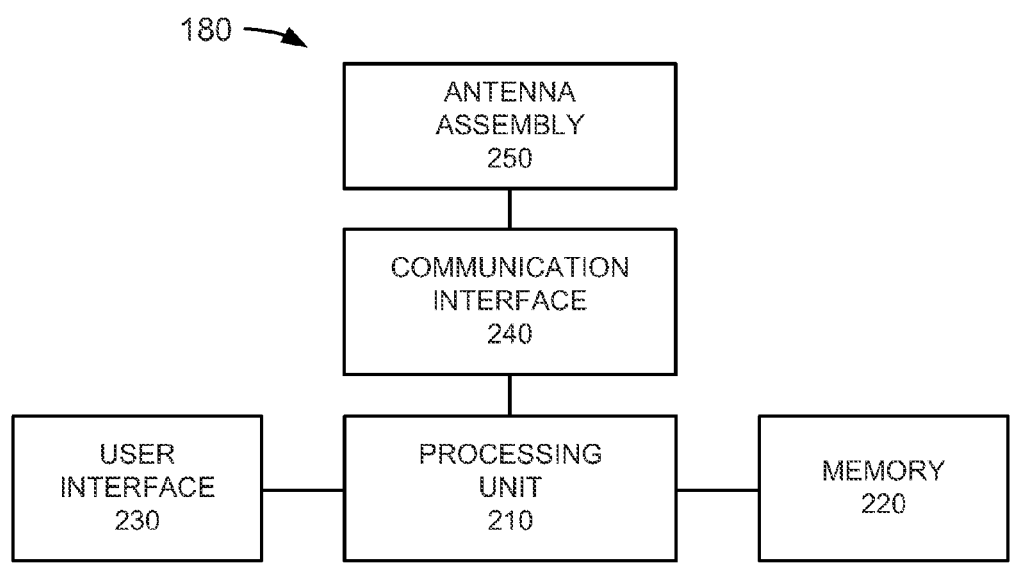
FIG. 2 is a diagram illustrating exemplary components of the mobile device of FIG. 1.

FIG. 2 is a diagram illustrating exemplary components of mobile device 180. As shown in FIG. 2, mobile device 180 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), or other processing logic. Processing unit 210 may control operation of mobile device 180 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may include mechanisms for inputting information to mobile device 180 and/or for outputting information from mobile device 180. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, a keyboard, or keys of a keypad) and/or a touchscreen to permit data and control commands to be input into mobile device 180; a display, such as an LCD, to output visual information; a vibrator to cause mobile device 180 to vibrate; and/or any other type of input or output device.

Communication interface 240 may include a transceiver that enables mobile device 180 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFD)) interface, a near-field communications (NFC) wireless interface, and/or any other type of interface that converts data from one form to another form.

Antenna assembly 250 may include one or more antennas to transmit and/or receive RF signals over the air. Antenna assembly 250 may, for example, receive RF signals from communication interface 240 and transmit the signals over the air and receive RF signals over the air and provide them to communication interface 240.

As described herein, mobile device 180 may perform certain operations in response to processing unit 210 executing software instructions contained in a computer-readable medium, such as memory 220. A computer-readable medium may be defined as a non-transitory memory device. A memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 2 shows example components of mobile device 180, in other implementations, mobile device 180 may include fewer components, different components, differently arranged components, or additional components than depicted in FIG. 2. Additionally or alternatively, one or more components of mobile device 180 may perform the tasks described as being performed by one or more other components of mobile device 180.

Figure 3:
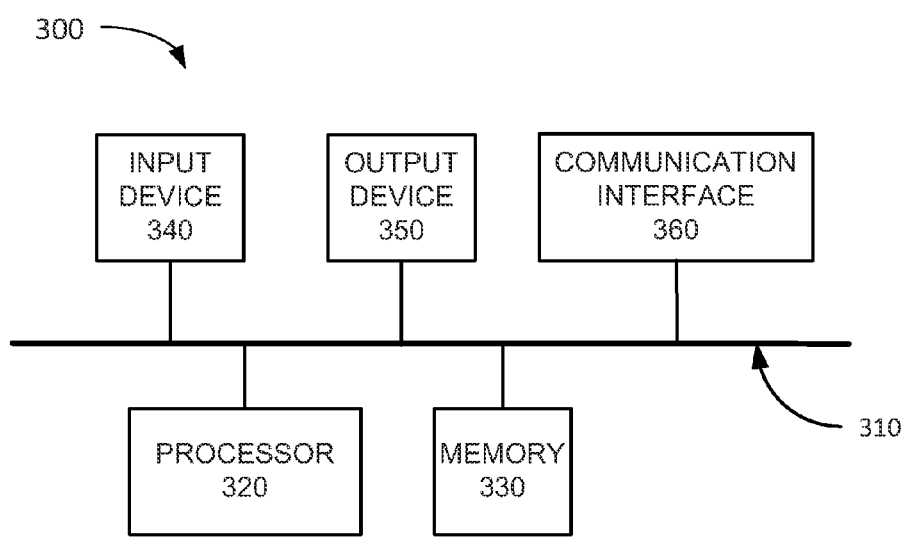
FIG. 3 is a diagram illustrating exemplary components that may be included in one of the devices of FIG. 1.

FIG. 3 is a diagram illustrating an exemplary device 300 that may be included in a component of the environment of FIG. 1 according to an implementation described herein. Local head end 110, PGW 132, ND 136, NT 142, STB 144, TV 145, personal computer 160, and/or gaming system 170, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFD)) interface, a near-field communications (NFC) wireless interface, and/or any other type of interface that converts data from one form to another form.

As will be described in detail below, device 300 may perform certain operations relating to receiving and/or providing caller ID information for an incoming call and/or processing instructions for an incoming call. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
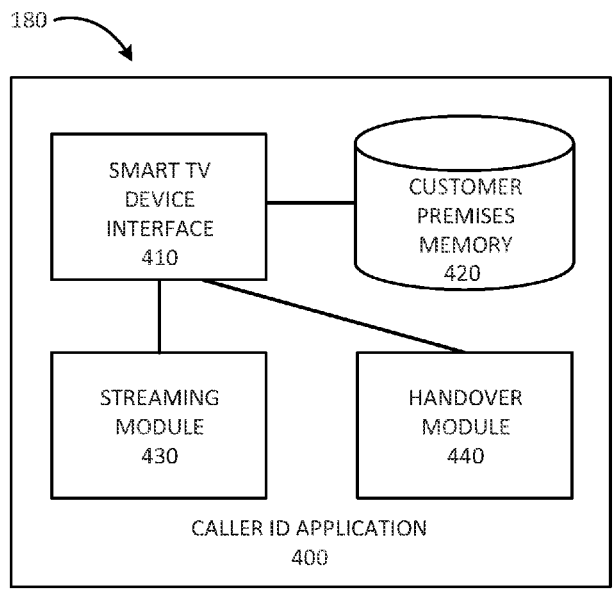
FIG. 4 is a diagram illustrating exemplary functional components of the mobile device of FIG. 1 according to an implementation described herein.

FIG. 4 is a diagram illustrating exemplary functional components of mobile device 180 according to an implementation described herein. The functional components of mobile device 180 may be implemented, for example, via processing unit 210 executing instructions from memory 220. Alternatively, some or all of the functional components of mobile device 180 may be implemented via hard-wired circuitry. As shown in FIG. 4, mobile device 180 may include a caller ID application 400.

Caller ID application 400 may register mobile device 180 with a smart TV device and may provide caller ID information, associated with an incoming call, to the registered smart TV device. Caller ID application 400 may include a smart TV device interface 410, a customer premises memory 420, a streaming module 430, and a handover module 440.

Smart TV device interface 410 may detect that mobile device 180 is located in, or within a particular distance of, customer premises 140. For example, smart TV device interface 410 may detect the location of customer premises 140 based on information explicitly provided by the user in the past and/or based on the user's behavior. Additionally or alternatively, smart TV device interface 410 may detect a particular device and/or connection, such as WiFi AP 150 or a Bluetooth connection with a device in customer premises 140 based on, for example, a device identifier. Smart TV device interface 410 may advertise caller ID application 400 over the detected connection. A caller ID application installed on a smart TV device may detect the advertisement and may respond with a request to register mobile device 180. Smart TV device interface 410 may register mobile device 180 with the detected smart TV device. In some implementations, smart TV device interface 410 may provide a caller ID application to a detected smart TV device and may instruct the smart TV device to install the provided caller ID application. Smart TV device interface 410 may provide information relating to a detected smart TV device to provider network 135.

Customer premises memory 420 may store information relating to customer premises 140 associated with the user of mobile device 180. As an example, customer premises memory 420 may store a device identifier, a user profile, and/or a user password associated with NT 142, STB 144, TV 145, WiFi AP 150, personal computer 160, gaming system 170, and/or another device. As another example, customer premises memory 420 may store a location of customer premises 140 that may be used to detect when mobile device 180 is located in, or within a particular distance, of customer premises 140. As yet another example, customer premises memory 420 may store information about smart TV devices for which the user has rejected a pairing and requests to pair up from a rejected smart TV device may be ignored.

Streaming module 430 may stream audio received by mobile device 180 to a registered smart TV device when a user selects to stream a telephone call to the smart TV device. Moreover, streaming module 430 may receive streamed audio input from the smart TV device and may incorporate the received audio input into the telephone call and may send the incorporate audio input toward the other party associated with the telephone call.

Handover module 440 may hand over a telephone call to a smart TV device. For example, if a user selects to hand over the telephone call to the smart TV device, handover module 440 may instruct provider network 135 (e.g. an IMS network) to establish a connection with the smart TV device via NT 142.

Although FIG. 4 shows exemplary functional components of mobile device 180, in other implementations, mobile device 180 may include fewer functional components, different functional components, differently arranged functional components, or additional functional components than depicted in FIG. 4. Additionally or alternatively, one or more functional components of mobile device 180 may perform functions described as being performed by one or more other functional components of mobile device 180.

Figure 5:
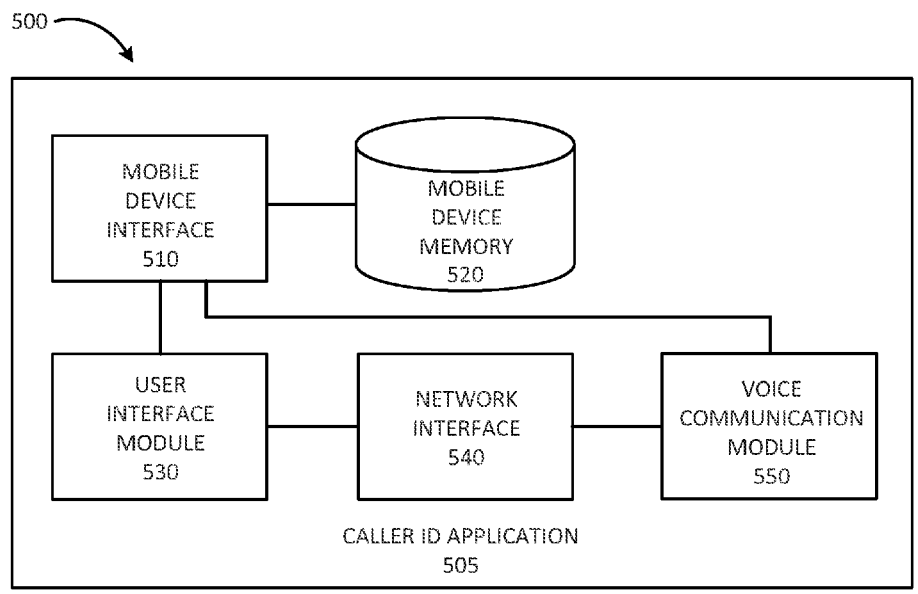
FIG. 5 is a diagram illustrating exemplary functional components of a smart television device according to an implementation described herein.

FIG. 5 is a diagram illustrating exemplary functional components of a smart TV device 500 according to an implementation described herein. Smart TV device 500 may correspond to STB 144, television 145, personal computer 160, and/or gaming system 170. The functional components of smart TV device 500 may be implemented, for example, via processor 320 executing instructions from memory 330. Alternatively, some or all of the functional components of smart TV device 500 may be implemented via hard-wired circuitry. As shown in FIG. 5, smart TV device 500 may include a caller ID application 505.

Caller ID application 505 may receive caller ID information from mobile device 180, or from provider network 135, may generate a user interface that includes the received caller ID information, and may display the generated user interface in an output device. Caller ID application 505 may receive a selection from the user as to how to process an incoming call associated with the caller ID information and may send instructions to mobile device 180 or to provider network 135. In some implementations, caller ID application 505 may be installed by a manufacturer, provided by local head end 110, and/or provided by provider network 135. In other implementations, caller ID application 505 may be received from mobile device 180. Caller ID application 505 may include a mobile device interface 510, a mobile device memory 520, a user interface module 530, a network interface 540, and a voice communication module 550.

Mobile device interface 510 may communicate with mobile device 180. For example, mobile device interface 510 may register mobile device 180 with smart TV device 500, may receive caller ID information from mobile device 180, and may send instructions to mobile device 180 on how to process an incoming call.

Mobile device memory 520 may store information relating to mobile device 180. For example, mobile device memory 520 may store a mobile device identifier associated with mobile device 180, such as an MSISDN, an IMSI number, an MIN, an IMEI, an ICCI, and/or any other mobile device identifier. Mobile device memory 520 may store additional information in association with the mobile device information, such as subscriber information associated with the mobile device information and/or configuration information associated with the mobile device information. Mobile device memory 520 may store information for multiple mobile devices 180 and may use the stored information to determine which particular mobile device 180 is associated with caller ID information for an incoming call.

User interface module 530 may generate a user interface that may include caller ID information for an incoming call to mobile device 180. For example, the user interface may include an indication of an incoming call, information identifying mobile device 180, the received caller ID information (e.g., a name and phone number of the calling party), and one or more options for processing the incoming call. User interface module 530 may receive a selection from the user via an input device associated with smart TV device 500 and may generate instructions to be sent to mobile device 180 or provider network 135 based on the selection.

Network interface 540 may communicate with provider network 135 (e.g., with network device 136). For example, in some implementations, network interface 540 may receive caller ID information for an incoming call to mobile device 180 from provider network 135 and may send instructions on how to process the incoming call to provider network 135.

Voice communication module 550 may manage voice communication for telephone calls that are streamed to smart TV device 500 from mobile device 180 and/or that are handed over to smart TV device 500 from mobile device 180 by provider network 135. For example, voice communication module 500 may receive audio input via an input device associated with smart TV device 550 and may convert the audio input into a format compatible with mobile device 180 and/or compatible with provider network 135. Furthermore, voice communication module 500 may receive data from mobile device 180 or from provider network 135, may extract audio output from the received data, and may output the audio output via one or more speakers associated with smart TV device 500.

Although FIG. 5 shows exemplary functional components of smart TV device 500, in other implementations, smart TV device 500 may include fewer functional components, different functional components, differently arranged functional components, or additional functional components than depicted in FIG. 5. Additionally or alternatively, one or more functional components of smart TV device 500 may perform functions described as being performed by one or more other functional components of smart TV device 500.

Figure 6:
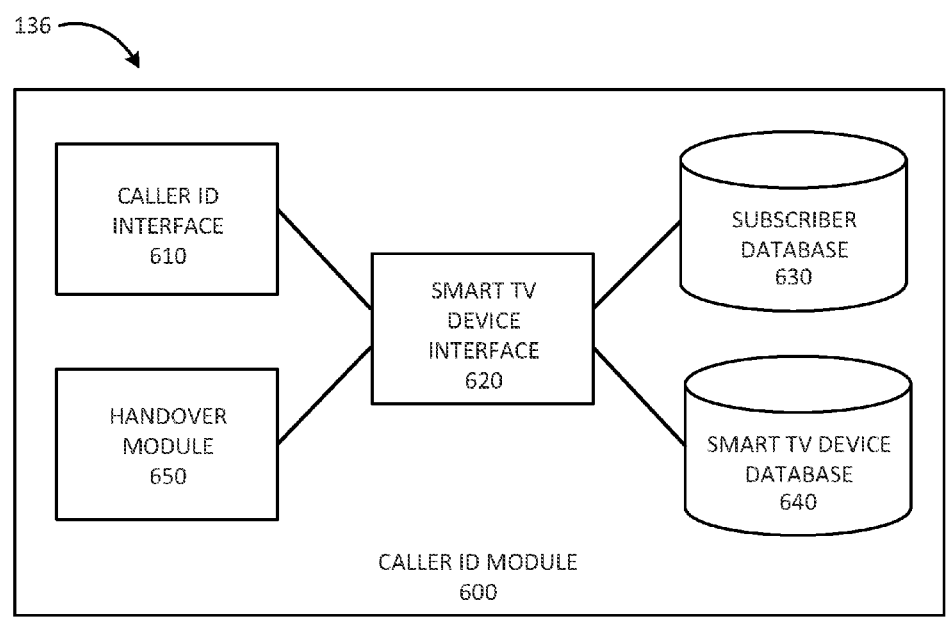
FIG. 6 is a diagram illustrating exemplary functional components of the network device of FIG. 1 according to an implementation described herein.

FIG. 6 is a diagram illustrating exemplary functional components of network device 136 according to an implementation described herein. The functional components of network device 136 may be implemented, for example, via processor 320 executing instructions from memory 330. Alternatively, some or all of the functional components of network device 136 may be implemented via hard-wired circuitry. As shown in FIG. 6, network device 136 may include a caller ID module 600. Caller ID module 600 may process the providing of caller ID information to subscribers. Caller ID module 600 may include a caller ID interface 610, a smart TV device interface 620, a subscriber database 630, a smart TV device database 640, and a handover module 650.

Caller ID interface 610 may communicate with caller ID system 190. For example, caller ID interface 610 may request caller ID information for a particular mobile device identifier associated with a telephone call being processed by provider network 135 and may receive the caller ID information from caller ID system 190.

Smart TV device interface 620 may communicate with smart TV device 500. For example, smart TV device interface 620 may provide caller ID information to smart TV device 500 and/or may receive instructions from smart TV device 500 on how to process an incoming call associated with the provided caller ID information. Subscriber database 630 may store information relating to subscribers associated with provider network 135. For example, subscriber database 630 may store information identifying smart TV devices (e.g., IP addresses, usernames and passwords, etc.), and/or other devices associated with customer premises 140 (e.g., NT 142), received from mobile device 180.

Smart TV device database 640 may store information relating to particular types of smart TV devices. For example, smart TV device database 640 may associate particular communication formats, particular caller ID applications 505, particular supported functionality, and/or other type of information associated with a particular smart TV device type.

Handover module 650 may process hand over requests received from mobile device 180 and/or smart TV device 500 for an incoming telephone call associated with mobile device 180. For example, handover module 650 may receive a request to hand over a telephone call from mobile device 180 to STB 144 and may establish a connection for the incoming telephone call from network device 136 to STB 144 via local head end 110 and NT 142.

Although FIG. 6 shows exemplary functional components of network device 136, in other implementations, network device 136 may include fewer functional components, different functional components, differently arranged functional components, or additional functional components than depicted in FIG. 6. Additionally or alternatively, one or more functional components of network device 136 may perform functions described as being performed by one or more other functional components of network device 136.

Figure 7:
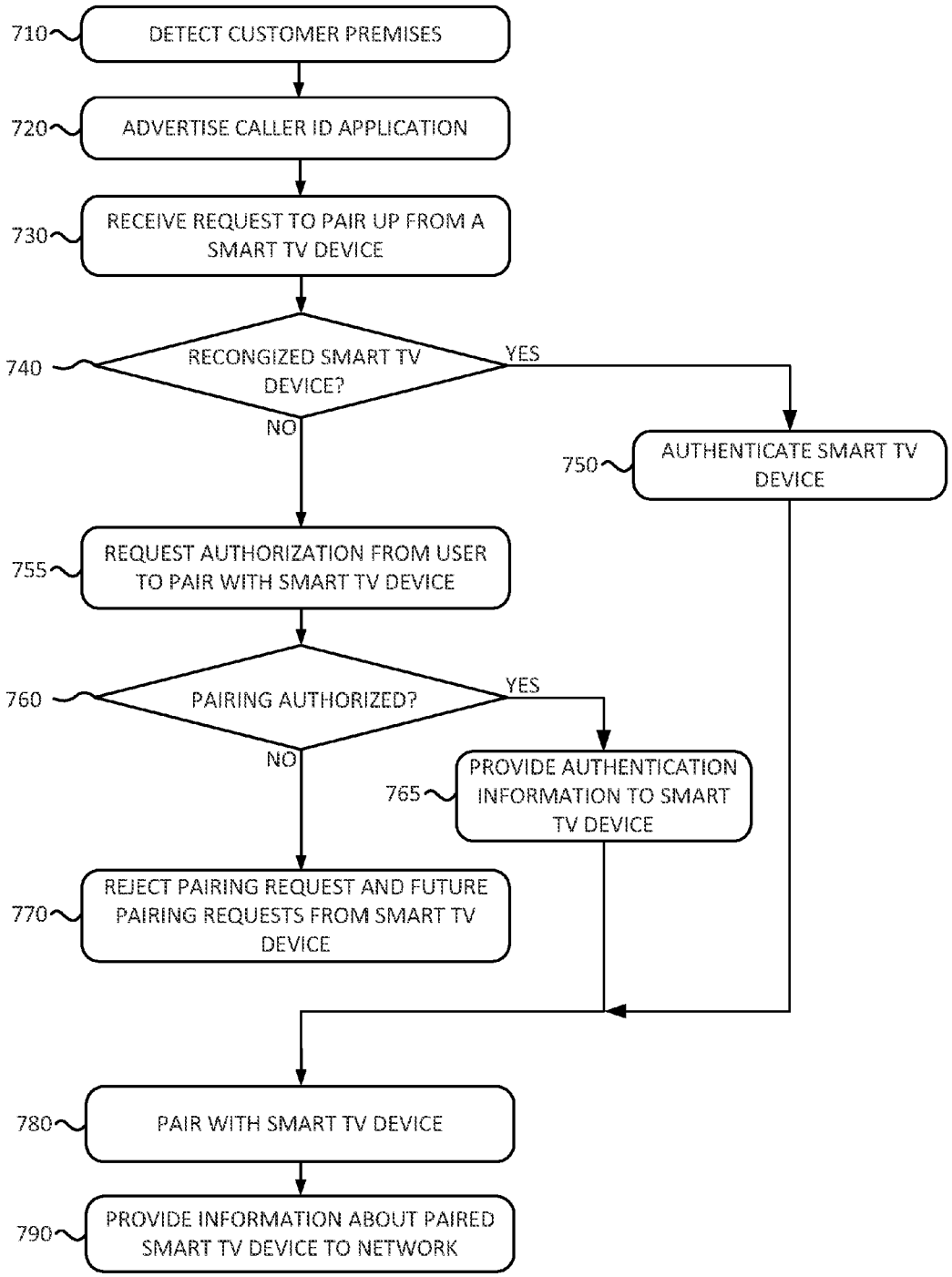
FIG. 7 is a flowchart of an exemplary process pairing a mobile device with a smart television device according to an implementation described herein.

FIG. 7 is a flowchart of an exemplary process pairing a mobile device with a smart television device according to an implementation described herein. In one implementation, the process of FIG. 7 may be performed by mobile device 180. In other implementations, some or all of the process of FIG. 7 may be performed by another device or a group of devices separate from mobile device 180 and/or including mobile device 180.

The process of FIG. 7 may include detecting customer premises (block 710). As an example, the user may specify a location for customer premises 140 in caller ID application 400 and caller ID application 400 may detect the specified location. As another example, the user may access network 130 using WiFi AP 150 and mobile device 180 may record an identifier and/or password associated with WiFi AP 150. As yet another example, caller ID application 400 may detect that mobile device 180 has not moved for a particular length of time during a particular time of day (e.g., during evening hours) and may thus determine that the location of mobile device 180 corresponds to customer premises 140.

A caller ID application may be advertised (block 720). For example, caller ID application 400 may establish a connection with a device at customer premises 140 and may send an advertisement message that indicates the presence of caller ID application 400 on mobile device 180. As an example, caller ID application 400 may send the advertisement message via WiFi AP 150 to all devices connected to WiFi AP 150. As another example, caller ID application 400 may establish a Bluetooth connection with a smart TV device at customer premises and may send the advertisement message via the Bluetooth connection. As yet another example, caller ID application 400 may establish an IP connection with NT 142 via PGW 132 and local head end 110. NT 142 may forward the advertisement message to any device with IP connectivity reachable through NT 142.

A request to pair up may be received from a smart TV device (block 730). For example, a smart TV device (e.g., STB 144, TV 145, personal computer 160, gaming system 170, etc.) may detect the advertisement message and may respond by requesting to pair up with mobile device 180. The request to pair up may include a smart TV device identifier associated with the smart TV device (e.g., device name, IP address, serial number, etc.).

A determination may be made as to whether the smart TV device is recognized (block 740). For example, smart TV device interface 410 of mobile device 180 may access customer premises memory 420 to determine whether the user has previously either allowed or rejected the smart TV device. If the smart TV device is recognized (block 740—YES), the smart TV device may be authenticated (block 750). For example, if the user has previously rejected an authorization to pair up with the smart TV device, the request may be rejected. If the user has previously authorized to pair up with the smart TV device, mobile device 180 may request authentication information from the smart TV device. For example, mobile device 180 may request a username, associated with a particular user profile on the smart TV device, and/or a password. The smart TV device may provide the requested information, encrypted using a public key previously provided to the smart TV device by mobile device 180. Mobile device 180 may decrypt the received information using a private key and may authenticate the smart TV device if the information matches information stored in customer premises memory 420. Processing may continue to block 780.

If the smart TV device is not recognized (block 740—NO), an authorization may be requested, from the user, to pair up with the smart TV device (block 755). For example, mobile device 180 may display the device name of the smart TV device, along with information that the smart TV device would like to pair up in order to receive caller ID information. The user may be provided with an option to allow the pairing and with an option to reject the pairing.

If the pairing is authorized (block 760—YES), authentication information may be provided to the smart TV device (block 765). For example, the smart TV device may provide a public key to mobile device 180 and mobile device 180 may send a password to the smart TV device along with other information associated with mobile device 180, such as a mobile device identifier associated with mobile device 180, subscriber information associated with mobile device 180, information relating to provider network 135, information relating to a particular type of caller ID application associated with mobile device 180, and/or any other type of information that may be requested by the smart TV device or sent by mobile device 180. Furthermore, mobile device 180 may provide a public key to the smart TV device and smart TV device may use the public key to encrypt the password when sending the password to mobile device 180 in future authentication processes. Once the requested information is received by the smart TV device, the smart TV device may send a confirmation to mobile device 180.

In some implementations, mobile device 180 may detect a smart TV device and may determine that smart TV device does not include caller ID application 505. In response, caller ID application 400 may provide caller ID application 505 to the smart TV device or may instruct the smart TV device to download caller ID application 505 from a particular location (e.g., a particular server device). Processing may continue to block 780.

If the pairing is not authorized (block 760—NO), the pairing request may be rejected and future pairing requests from the smart TV device may be rejected (block 770). For example, smart TV device interface 410 may store the smart TV device identifier in customer premises memory 420 along with an indication that future requests to pair up with the smart TV device may be ignored. The user may be able to reset this indication using caller ID application 400 if the user decided to authorize the smart TV device in the future.

If the smart TV device has been authenticated and/or authorized for pairing by the user, the smart TV device may be paired with the mobile device (block 780). For example, mobile device 180 may store an indication in customer premises memory 420 that caller ID information, associated with incoming calls, should be forwarded to the smart TV device. Furthermore, mobile device 180 may instruct the smart TV device to send instructions from the user on how to process an incoming call to mobile device 180 and/or to provider network 135.

Smart TV information may be provided to a network (block 790). In some implementations, caller ID application 400 may send information relating to a paired smart TV devices to network device 136 of provider network 135 (or to another device in provider network 135). In response, network device 136 may use the received information to send caller ID information to the paired smart TV device. For example, caller ID application 400 may send an IP address, and/or an STB identifier, associated with STB 144, to network device 136. When network device 136 obtains caller ID information relating to an incoming call for mobile device 180, network device 136 may establish a connection with STB 144 using the IP address, and/or the STB identifier, and may send the obtained caller ID information to STB 144.

In some implementations, mobile device 180 may register with multiple smart TV devices in customer premises 140. For example, mobile device 180 may register with STB 144 and with gaming system 170. If mobile device 180 registers with multiple smart TV devices, mobile device 180 may need to select one of the smart TV devices to which to send caller ID information. In some implementations, mobile device 180 may send caller ID information to all the smart TV devices with which mobile device 180 has registered. In other implementations, mobile device 180 may determine which smart TV device is in use and may select to send the caller ID information to the smart TV device that is in use.

In some implementations, once mobile device 180 is registered with smart TV device 500, mobile device 180 may provide other types of information to smart TV device 500. As an example, mobile device 180 may forward text messages to smart TV device 500 and smart TV device 500 may display the received text messages. As another example, mobile device 180 may forward email messages to smart TV device 500 and smart TV device 500 may display the received email messages. A user may configure mobile device 180 to determine whether a message should be forwarded based on one or more criteria (e.g., an importance assigned to the contact from which a message has been received, an importance assigned to a message by a sending party, etc.).

Figure 8:
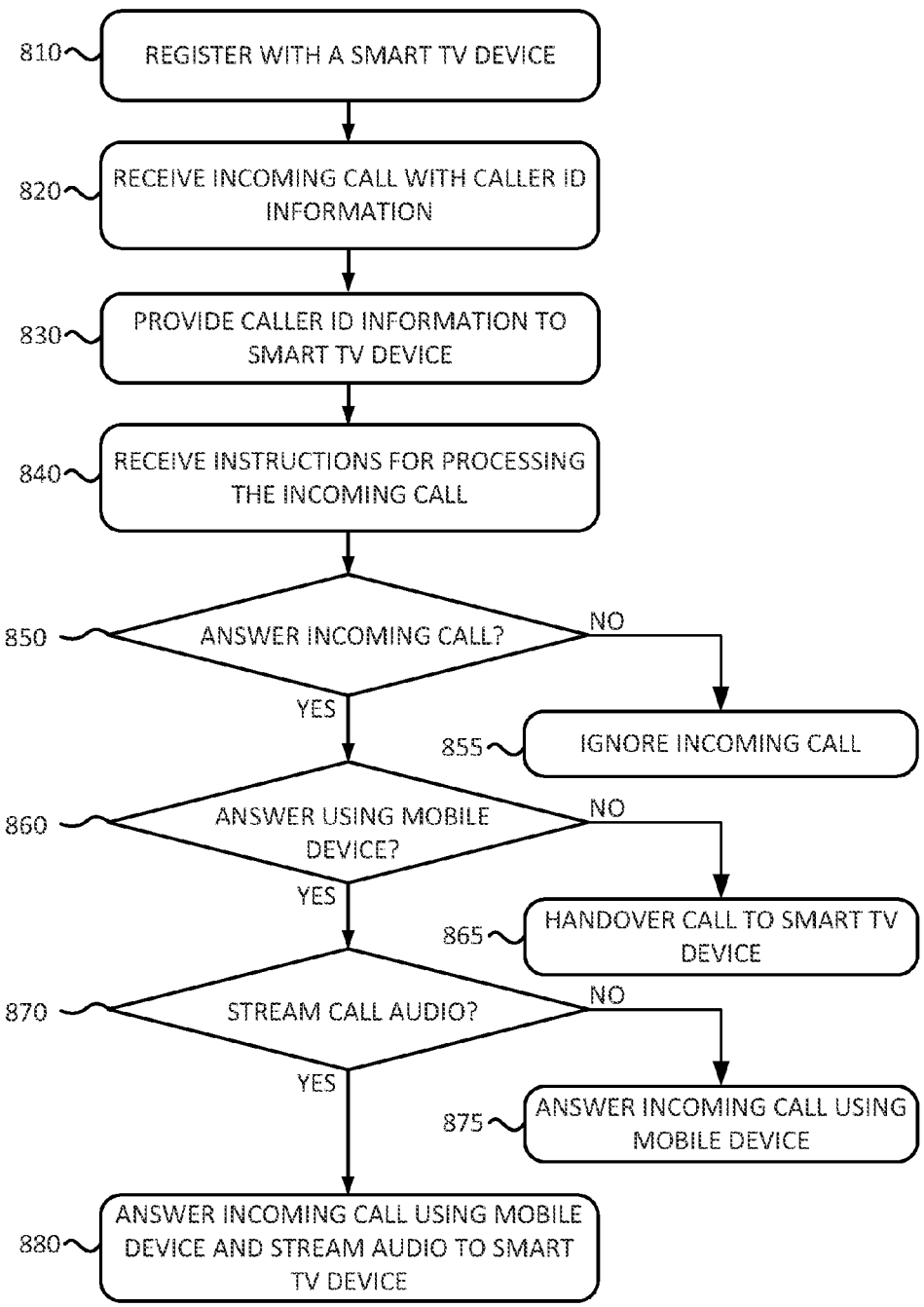
FIG. 8 is a flowchart of an exemplary process for interacting with a smart television device according to an implementation described herein.

FIG. 8 is a flowchart of an exemplary process for interacting with a smart television device according to an implementation described herein. In one implementation, the process of FIG. 8 may be performed by mobile device 180. In other implementations, some or all of the process of FIG. 8 may be performed by another device or a group of devices separate from mobile device 180 and/or including mobile device 180.

The process of FIG. 8 may include registering with a smart TV device (block 810). For example, mobile device 180 may register with a smart TV device using the process described above with reference to FIG. 7. An incoming call may be received with caller ID information (block 820). For example, network device 136 may establish a connection with mobile device 180 using base station 134 (and/or PGW 132) in response to detecting an incoming call to mobile device 180. Network device 136 may obtain caller ID information of the calling party, associated with the incoming call, from caller ID system 190. Network device 136 may send information regarding the incoming call to mobile device 180, along with the obtained caller ID information and a request to answer the incoming call. The caller ID information may be provided to the smart TV device (block 830). For example, caller ID application 400 may send the caller ID information (e.g., phone number and name of the calling party) to caller ID application 505 of the smart TV device with which mobile device 180 has registered.

In some implementations, block 830 may not be performed and the caller ID information may be provided to the smart TV device directly by network device 136. For example, whether the caller ID information is provided by mobile device 180 or by network device 136 may depend on a type of provider network 135. If provider network 135 is associated with a CDMA or GSM wireless network, the caller ID information may be sent to mobile device 180 via a voice signaling channel. Therefore, in a CDMA or GSM network, the caller ID information may be extracted by caller ID application 400 in mobile device 180. If provider network 135 is associated with an LTE network, the caller ID information may be sent to mobile device 180 via an IP message. Thus, the IP message may also be sent to the smart TV device by provider network 135 via local head end 110.

Instructions for processing the incoming call may be received (block 840). In some implementations, mobile device 180 may receive instructions from smart TV device 500. In other implementations, mobile device 180 may receive instructions from provider network 135. A determination may be made as to whether to answer the incoming call (block 850). For example, the user may select how to process the call by providing input to the smart TV device via an input device (e.g., remote control 146, a keyboard associated with personal computer 160, a gaming controller associated with gaming system 170, etc.). The user may select to answer the incoming call.

If the incoming call is not to be answered (block 850—NO), the incoming call may be ignored (block 855). For example, mobile device 180 may receive instructions to ignore the incoming call. In response, mobile device 180 may ignore the incoming call and/or may send the incoming call straight to voicemail. If the incoming call is to be answered (block 850—YES), a determination may be made as to whether the call is to be answered using the mobile device (block 860). For example, the user may select to answer the incoming call using mobile device 180 or may select to hand the incoming call over to smart TV device 500 and mobile device 180 may receive instructions to answer the call either using mobile device 180 or using smart TV device 500.

If the call is not to be answered using the mobile device (block 860—NO), the call may be handed over to the smart TV device (block 865). For example, mobile device 180 may receive instructions from the smart TV device to hand the call over to the smart TV device and may reply to the incoming call with instructions to hand the call over to the smart TV device. If the call is to be answered using the mobile device (block 860—YES), a determination may be made as to whether to stream the call audio (block 870). For example, the user may select to stream the audio from the call to the smart TV device.

If the call audio is not to be streamed (block 870—NO), the incoming call may be answered using the mobile device (block 875). For example, mobile device 180 may receive instructions to answer the incoming call or may receive an indication that the user intends to answer the incoming call. In some implementations, mobile device 180 may answer the incoming call and may send a delay message to the calling party. For example, the user may have stored a pre-recorded message in connection with caller ID application 400, which may state "Hi, I am on my way to answer your call. Please give me a few moments." As another example, caller ID application 400 may generate a default delay message that may be sent to the calling party.

If the call audio is to be streamed (block 870—YES), the incoming call may be answered using the mobile device and the call audio may be streamed to the smart TV device (block 880). For example, mobile device 180 may receive instructions from smart TV device 500 to answer the incoming call and to stream audio from the incoming call to smart TV device 500. Thus, incoming audio received by mobile device 180 may be streamed to smart TV device 500 and audio input received by smart TV device 500 may be streamed to mobile device 180 and sent to the calling party over the established telephone connection.

Figure 9:
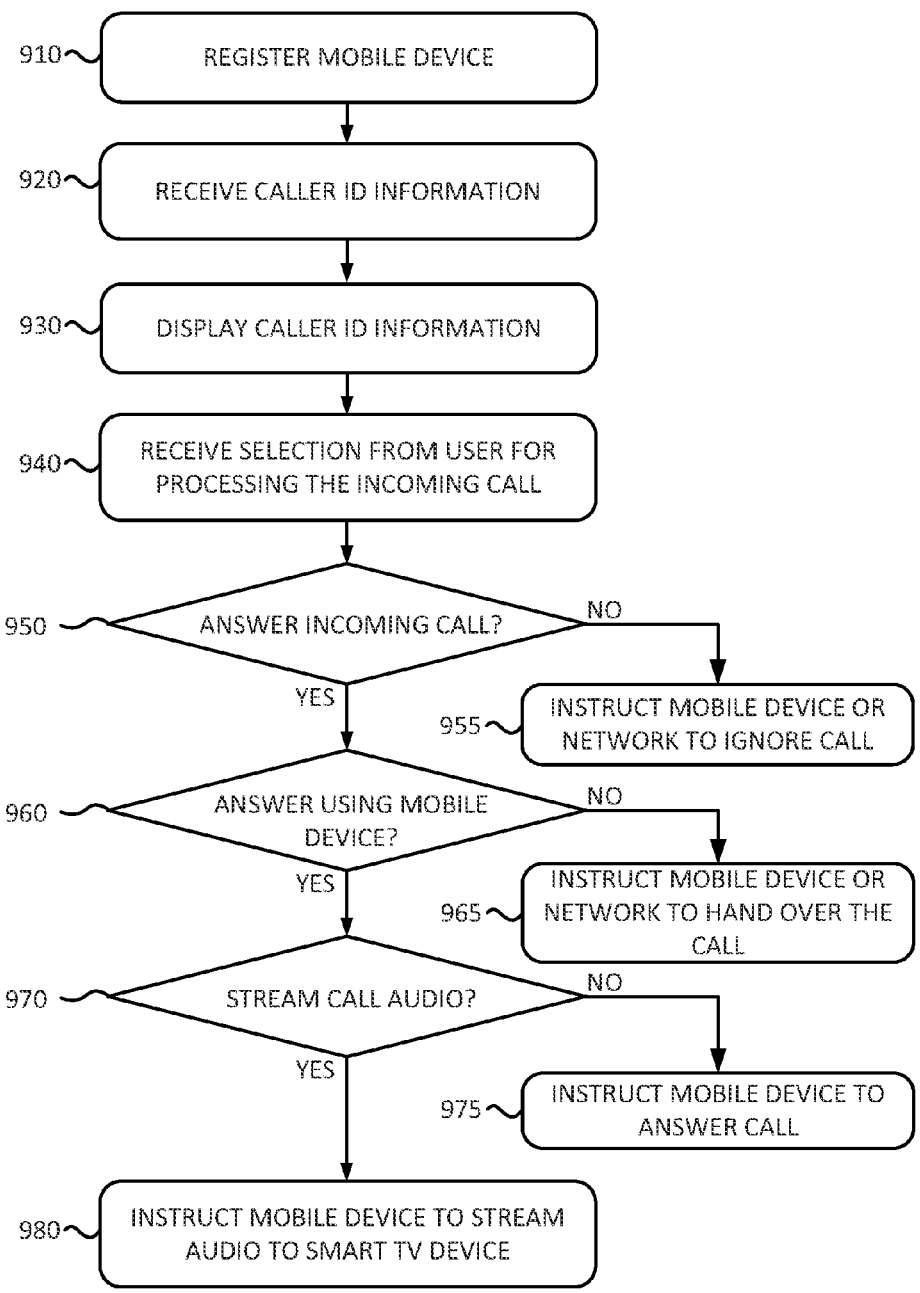
FIG. 9 is a flowchart of an exemplary process for receiving caller identification information according to an implementation described herein.

FIG. 9 is a flowchart of an exemplary process for receiving caller identification information according to an implementation described herein. In one implementation, the process of FIG. 9 may be performed by smart TV device 500, such as STB 144, TV 145, personal computer 160, or gaming system 170. In other implementations, some or all of the process of FIG. 9 may be performed by another device or a group of devices separate from, and/or including STB 144, TV 145, personal computer 160, and/or gaming system 170.

The process of FIG. 9 may include registering a mobile device (block 910). For example, mobile device 180 may register with smart TV device 500 using the process described above with reference to FIG. 7. Caller ID information may be received (block 920). In some implementations (e.g., a CDMA or GSM network), the caller ID information, associated with an incoming call to mobile device 180, may be received from mobile device 180. The caller ID information may be received via WiFi AP 150, via a Bluetooth connection, or via a local IP connection. The local IP connection may include IP packets being sent from mobile device 180 to PGW 132, from PGW 132 to local head end 110, and from local head end 110 to NT 142. In other implementations (e.g., an LTE network), the caller ID information may be received from provider network 135. For example, ND 136 may send caller ID information to mobile device 180 and to any smart TV devices 500 with which mobile device 180 has registered.

The caller ID information may be displayed (block 930) and a selection may be received from the user for processing the incoming call (block 940). For example, user interface module 530 may generate a user interface that includes an indication of an incoming telephone call, that includes the received caller ID information, and that includes information about options that the user may select to process the incoming call. For example, the user may be provided with an option to ignore the call, an option to answer the call, an option to stream the call audio to smart TV device 500, an option to hand the call over to smart TV device 500, and/or other option to process the call. An exemplary user interface associated with STB 144 is described below with reference to FIG. 13. The user may select one of the provided options via an input device associated with smart TV device 500. As an example, if smart TV device 500 corresponds to STB 144, the user may select an option using remote control 146. As another example, if smart TV device 500 corresponds to gaming system 170, the user may select an option using a gaming controller associated with gaming system 170. In some situations, multiple mobile devices 180 may be registered with smart TV device 500 and smart TV device 500 may display information indicating which mobile device 180 is associated with the incoming call.

A determination may be made as to whether to answer the incoming call (block 950). For example, the user may select how to process the call by providing input to the smart TV device via an input device (e.g., remote control 146, a keyboard associated with personal computer 160, a gaming controller associated with gaming system 170, etc.). The user may select to answer the incoming call.

If the incoming call is not to be answered (block 950—NO), the mobile device may be instructed to ignore the call (block 955). For example, smart TV device 500 may send instructions to mobile device 180 to ignore the call. In some implementations, the instructions may be sent to mobile device 180 directly via WiFi AP 150, via a Bluetooth connection, or via a local IP connection. In other implementations, the instructions may be sent to provider network 135 via local head end 110.

If the incoming call is to be answered (block 950—YES), a determination may be made as to whether the call is to be answered using the mobile device (block 960). For example, the user may select to answer the incoming call using mobile device 180 or may select to hand the incoming call over to smart TV device 500. If the call is not to be answered using the mobile device (block 960—NO), the mobile device or the network may be instructed to hand over the call to the smart TV device (block 965). For example, smart TV device 500 may instruct mobile device 180, and/or provider network 135, to hand the call over to smart TV device 500. Handover module 650 of network device 136 may process the hand over request and may establish a connection from provider network 135 to smart TV device 136. If the call is to be answered using the mobile device (block 960—YES), a determination may be made as to whether to stream the call audio (block 970). For example, the user may select to stream the audio from the call to smart TV device 500.

If the call audio is not to be streamed (block 970—NO), the mobile device may be instructed to answer the call (block 875). For example, smart TV device 500 may send instructions to mobile device 180 to answer the incoming call or may send an indication that the user intends to answer the incoming call. If the call audio is to be streamed (block 970—YES), the mobile device may be instructed to answer the incoming call and to stream the audio to the smart TV device (block 980). For example, smart TV device 500 may establish a streaming connection with mobile device 180 and may instruct mobile device 180 to answer the call and to stream incoming audio from the call to smart TV device 500. Furthermore, smart TV device 500 may stream audio received via an audio input device to mobile device 180 via the established streaming connection.

Figure 10:
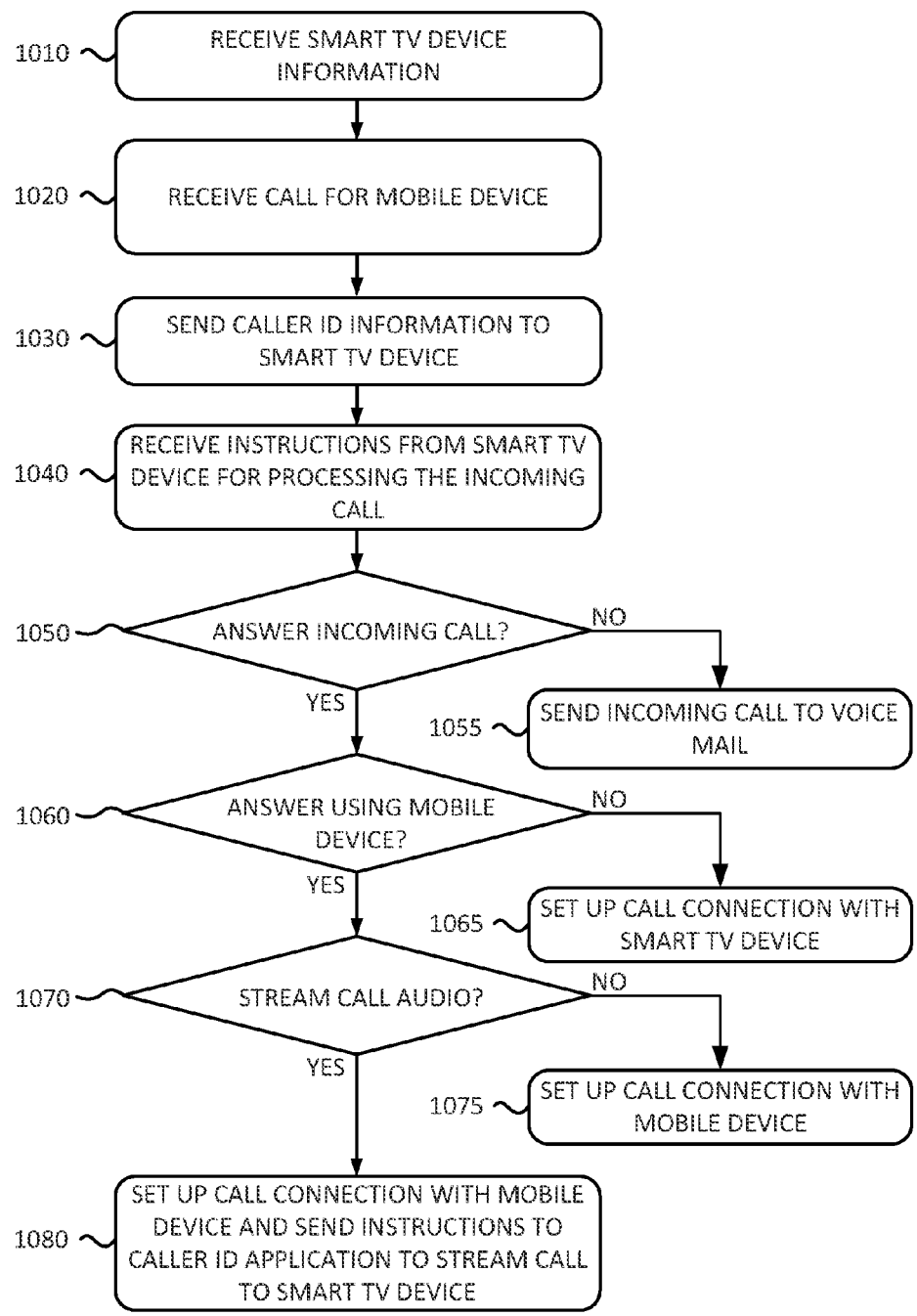
FIG. 10 is a flowchart of an exemplary process for providing caller identification information according to an implementation described herein.

FIG. 10 is a flowchart of an exemplary process for providing caller identification information according to an implementation described herein. In one implementation, the process of FIG. 10 may be performed by network device 136. In other implementations, some or all of the process of FIG. 10 may be performed by another device or a group of devices separate from network device 136 and/or including network device 136.

The process of FIG. 10 may include receiving smart TV device information (block 1010). For example, mobile device 180 may register with smart TV device 500 and may provide information relating to smart TV device (e.g., an identifier, an IP address, a username and password, etc.) to provider network 135. In some implementations, a same provider may be associated with mobile device 180 and NT 142. For example, the user may have a first account for mobile telephone services and a second account for cable television, an Internet connection, and/or a landline telephone service with the same provider. Thus, the provider may enable the user to automatically register mobile device 180 with, for example, STB 144 and may associate STB 144 with mobile device 180 in provider network 135. Network device 136 may store the received smart TV device information in subscriber database 630 in association with mobile device 180.

A call may be received for the mobile device (block 1020). For example, network device 136 may receive a request from a calling party to establish a telephone connection with mobile device 180. In response, caller ID interface 610 may obtain caller ID information for the calling party from caller ID system 190. In some situations, if the calling party is associated with provider network 135, the caller ID information may be obtained from subscriber database 630 without having to contact caller ID system 190.

The caller ID information may be sent to the smart TV device (block 1030) and instructions may be received from the smart TV device for processing the incoming call (block 1040). For example, smart TV device interface 620 may send one or more IP packets to smart TV device 500 via local head end 110 and NT 142, wherein the one or more IP packets include an indication of an incoming call and the caller ID information.

Smart TV device interface 620 may receive instructions from smart TV device 500 on how to process the incoming call (block 1040) and a determination may be made as to whether to answer the incoming call (block 1050). For example, the user may select how to process the call by providing input to smart TV device 500 via an input device (e.g., remote control 146, a keyboard associated with personal computer 160, a gaming controller associated with gaming system 170, etc.). The selection may be used to generate instructions for network device 136. The user may select to answer the incoming call. If the incoming call is not to be answered (block 1050—NO), the incoming call may be sent to voicemail (block 1055). For example, network device 136 may establish a connection with a voicemail server and may direct the incoming call to the voicemail server.

If the incoming call is to be answered (block 1050—YES), a determination may be made as to whether the call is to be answered using the mobile device (block 1060). For example, the user may select to answer the incoming call using the mobile device or may select to hand the incoming call over to smart TV device 500. If the call is not to be answered using the mobile device (block 1060—NO), a call connection may be set up with the smart TV device (block 1065). For example, handover module 650 may set up the call connection with smart TV device 500 and may terminate the connection with mobile device 180.

If the call is to be answered using the mobile device (block 1060—YES), a determination may be made as to whether to stream the call audio (block 1070). For example, the user may select to stream the audio from the call to smart TV device 500. If the call audio is not to be streamed (block 1070—NO), a call connection may be set up with the mobile device. In some implementations, network device 136 may send a delay message to the calling party. As an example, the user may have stored a pre-recorded message in connection with caller ID application 400, which may have been stored by caller ID module 600. As another example, caller ID application 400 may generate a default delay message that may be sent to the calling party.

If the call audio is to be streamed (block 1070—YES), a call connection may be set up with the mobile device and instructions may be sent to the caller ID application to stream the call to the smart TV device (block 1080). For example, network device 136 may set up the call connection with mobile device 180, may play a delay message, and may instruct caller ID application 400 to establish a streaming connection with smart TV device.

Figure 11:
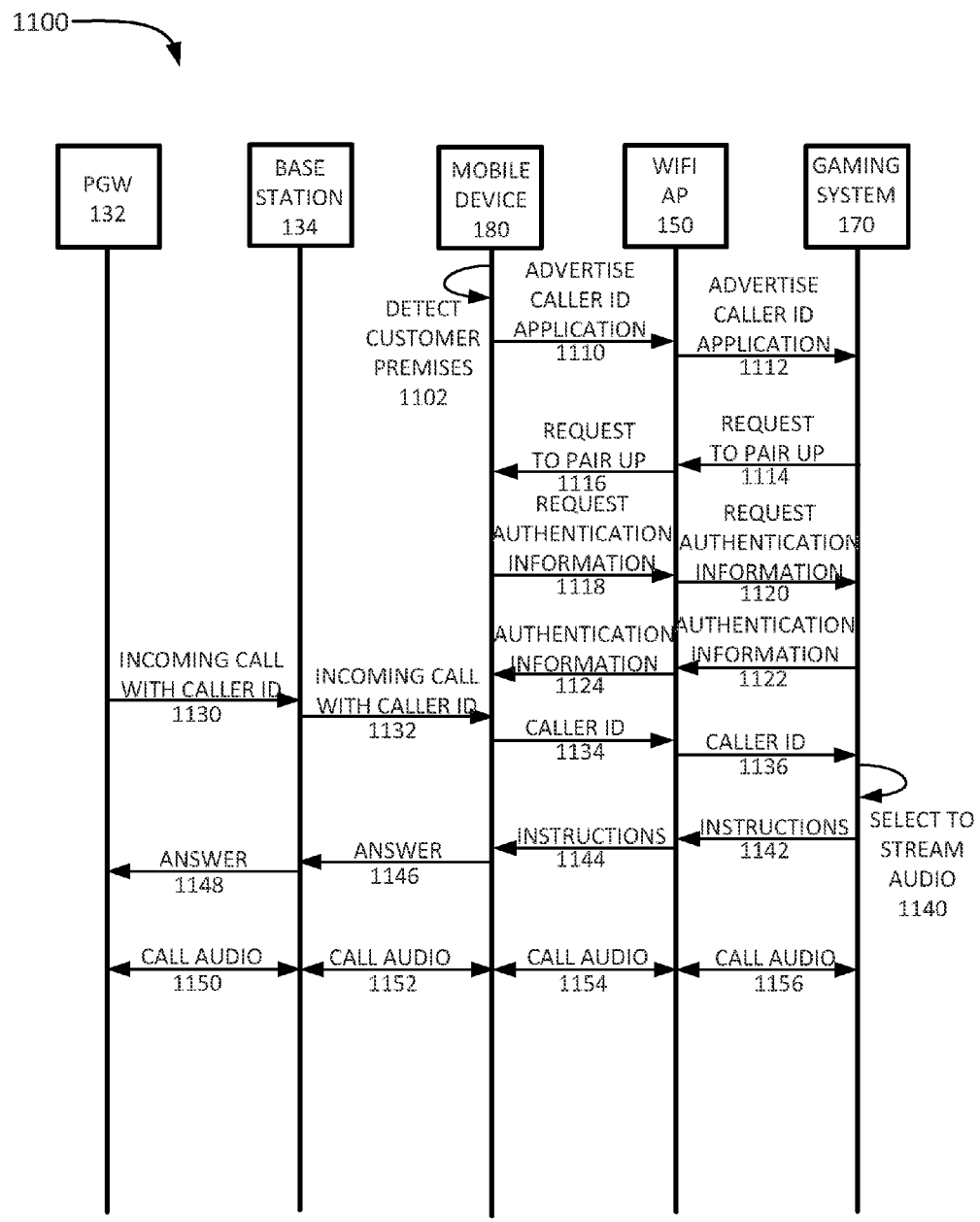
FIG. 11 is a diagram of a first exemplary signal flow according to an implementation described herein.

FIG. 11 is a diagram of a first exemplary signal flow 1100 according to an implementation described herein. Signal flow 1100 illustrates local pairing of mobile device 180 and gaming system 170 over WiFi AP 150 and illustrates mobile device 180 receiving caller ID information and providing the caller ID information to gaming system 170 over the WiFi connection. Signal flow 1100 may include mobile device 180 detecting customer premises 140 (signal 1102). For example, mobile device 180 may detect WiFi AP 150 and may log into WiFi AP 150.

Mobile device 180 may advertise caller ID application 400 to WiFi AP 150 (signal 1110) and WiFi AP 150 may forward the advertisement to gaming system 170 (signal 1112). Gaming system 170 may include caller ID application 505, may identify the advertisement, and may respond with a request to pair up with mobile device 180 (signal 1114) which may be forwarded by WiFi AP 150 to mobile device 180 (signal 1116). Mobile device 180 may respond by requesting authentication information from gaming system 170 via WiFi AP 150 (signals 1118 and 1120). Assuming that gaming system 170 has previously been authorized to pair up with mobile device 180 by the user, and has received authentication information from mobile device 180, gaming system 170 may respond with the authentication information (signals 1122 and 1124).

An incoming call may be received by mobile device 180 from provider network 135 via PGW 132 and base station 134 (signals 1130 and 1132). The incoming call may include caller ID information, such as the phone number and name of the calling party. Mobile device 180 may identify that mobile device 180 is registered with gaming system 170 and may send the caller ID information to gaming system 170 via WiFi AP 150 (signals 1134 and 1136). Gaming system 170 may generate a user interface that may be displayed on television 145. The user interface may include an option to answer the incoming call and to stream the audio to gaming system 170 and the user may select to stream the audio to gaming system 170 (signal 1140).

Gaming system 170 may send instructions to mobile device 180 to answer the call and to stream the audio to gaming system 170 (signals 1142 and 1144). Mobile device 180 may answer the call (signals 1146 and 1148). A call connection may be established between the calling party and mobile device 180 via base station 134 and PGW 132 (signals 1150 and 1152). Furthermore, mobile device 180 may establish a streaming connection with gaming system 170 via WiFi AP 150 (signals 1154 and 1156). Thus, audio received by mobile device 180 via base station 134 may be sent to gaming system 170 and audio received via gaming system 170 may be sent to base station 134.

Figure 12:
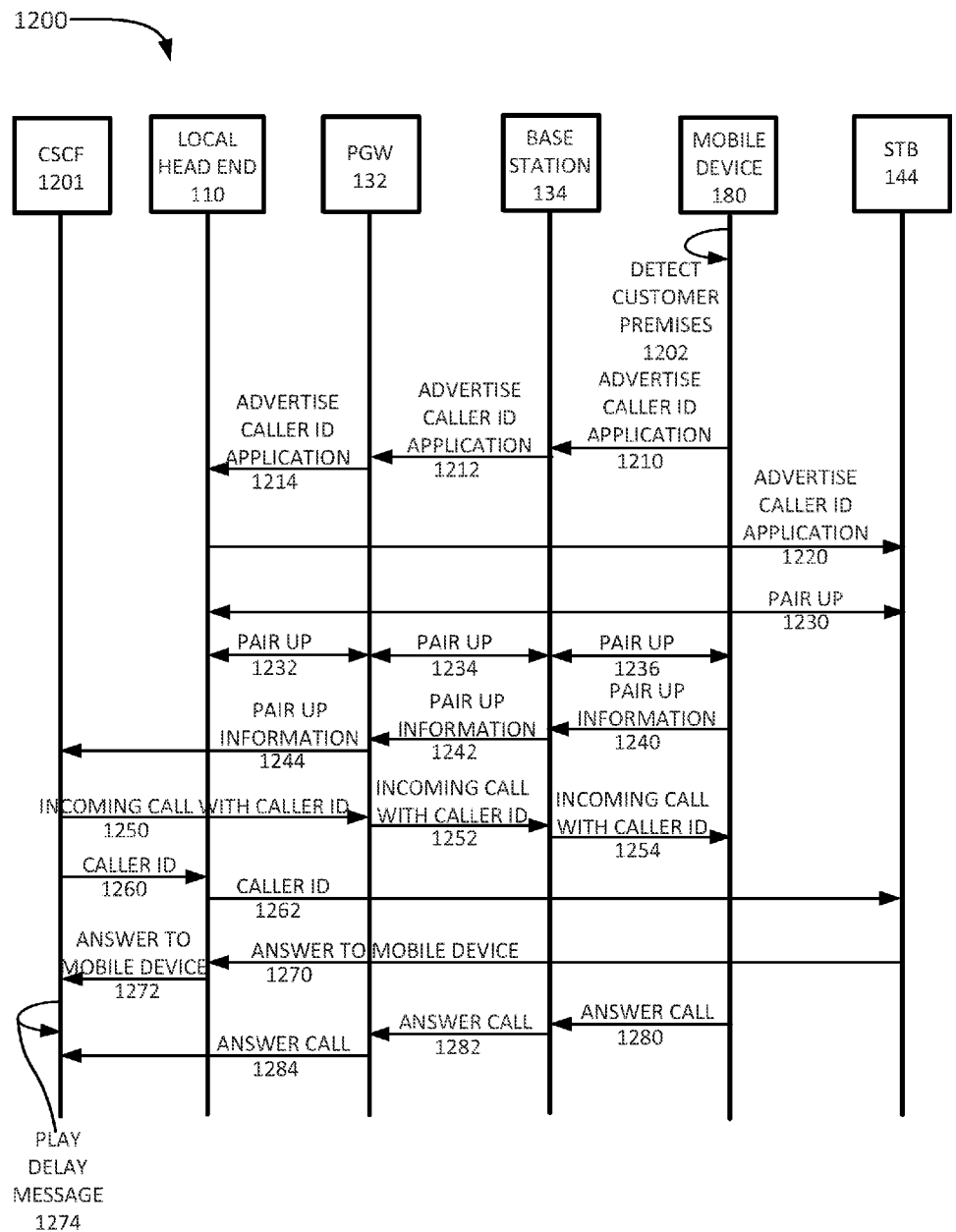
FIG. 12 is a diagram of a second exemplary signal flow according to an implementation described herein.

FIG. 12 is a diagram of a first exemplary signal flow 1200 according to an implementation described herein. Signal flow 1200 illustrates local pairing of mobile device 180 and STB 144 over a local IP connection and illustrates provider network 135 sending caller ID information to STB 144 via local head end 110. Signal flow 1200 may include mobile device 180 detecting customer premises 140 (signal 1202). For example, mobile device 180 may detect that mobile device 180 is in a location associated with customer premises 140, based on an address entered by the user in an address book application associated with mobile device 180. Furthermore, customer premises memory 420 may include an IP address associated with STB 144.

In response to detecting customer premises 140, caller ID application 400 may send an advertisement message to STB 144 via base station 134 and STB 132 (signals 1210, 1212 and 1214). The advertisement message may be routed to STB 144 via local head end 110 (signal 1220). Mobile device 180 may pair up with STB 144 via the connection through local head end 110 (signals 1230, 1232, 1234, and 1236). The pairing process may include authentication of STB 144 by mobile device 180 by receiving, for example, an encrypted password from STB 144. Mobile device 180 may provide an indication of the pairing to provider network 135. Provider network 135 may include an IMS network and the IMS network may include a CSCF device 1201 (corresponding to network device 136). Thus, mobile device 180 may send the pairing information to CSCF device 1201 (signals 1240, 1242, and 1244). CSCF device 1201 may now be configured to provide caller ID information, for incoming calls to mobile device 180, to STB 144.

An incoming call with caller ID information may be received by CSCF device 1201. CFCF device 1201 may send an indication of the incoming call, along with the caller ID information, to mobile device 180 via PGW 132 and base station 134 (signals 1250, 1252, and 1254). Additionally, CSCF device 1201 may send the caller ID information to STB 144 via local head end 110 (signals 1260 and 1262).

The user may select to answer the incoming call using mobile device 180 and STB 144 may send instructions to CSCF device 1201 to answer the call using mobile device 180 (signals 1270 and 1272). CSCF device 1201 may play a delay message to the calling party, informing the calling party that the user will shortly answer the incoming call. Once the user reached mobile device 180, the user may answer the call (signals 1280, 1282, and 1284).

Figure 13:
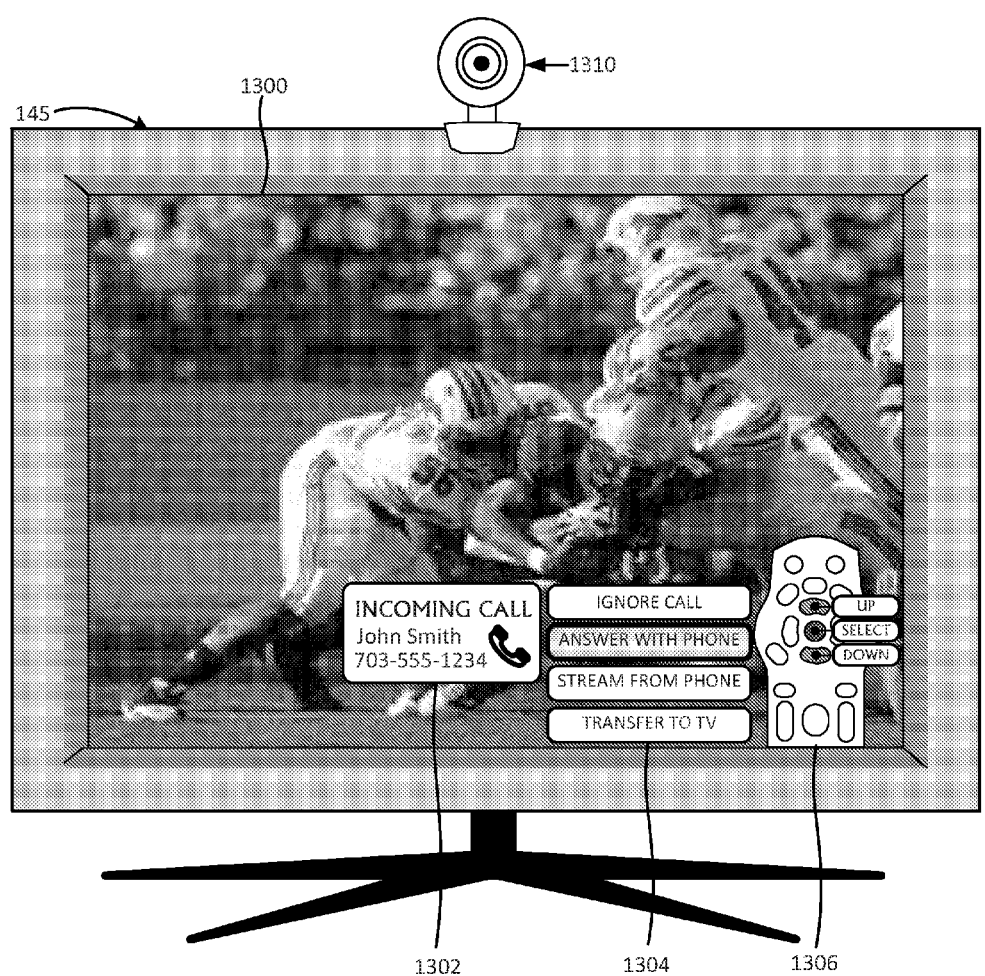
FIG. 13 is a diagram of an exemplary user interface according to an implementation described herein.

FIG. 13 is a diagram of an exemplary user interface 1300 according to an implementation described herein. User interface 1300 may be displayed on TV 145 by STB 144 while the user is watching television. As shown in FIG. 13, TV 145 may include a video camera 1310 that may enable the user to use TV 145 for video calls. STB 144 may receive caller ID information from mobile device 180 for an incoming call received by mobile device 180. User interface 130 may include caller ID information 1302, call processing options 1304, and an input device image 1306. Caller ID information 1302 may include the received caller ID information, such as a name and phone number of the calling party. Call processing options 1304 may include options to processing the call, such as an option to ignore the call, an option to answer the call using mobile phone 180, an option to stream the call audio from mobile phone 180, and/or an option to transfer the call to TV 145 using STB 144. Input device image 1306 may include an image of remote control 146 and may indicate how the user may use remote control 146 to select one of the options for processing the call.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 7-10, and a series of signals with respect to FIGS. 11 and 12, the order of the blocks and/or signals may be modified in other implementations. Further, non-dependent blocks may be performed in parallel.

As another example, while implementations have been described herein with respect to audio telephone calls, other implementations may be applied to video calls that include video images together with audio. Thus, a user may select to stream video images from mobile device 180 to smart TV device 500.

As yet another example, in some implementations, a user may select when caller ID information should be sent to smart TV device 500. For example, the user may select to send caller ID information to smart TV device 500 for particular calling parties, may select not to send caller ID information during particular times of day and/or during particular days of week, may select not to send caller ID information when the user is watching a particular television channel or playing a particular game. Further, whether caller ID information for a particular calling party is sent to smart TV device 500 may be based on an explicit designation for the particular calling party received from the user, based on a frequency with which the user communicates with the particular calling party, based on whether the particular calling party is listed as a contact in the user's address book in mobile device 180, etc.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a mobile communication device, the method comprising:
   detecting, by the mobile communication device, a smart television device;
   advertising, by the mobile communication device, a caller identification application associated with the mobile communication device to the smart television device, in response to detecting the smart television device;
   receiving, by the mobile communication device, a request to pair with the mobile communication device from the smart television device, in response to advertising the caller identification application;
   pairing, by the mobile communication device, with the smart television device, in response to receiving the request to pair with the mobile communication device;
   receiving, by the mobile communication device, an incoming telephone call, wherein the incoming telephone call includes caller identification information;
   providing, by the mobile communication device, the caller identification information to the smart television device based on the pairing;
   receiving, by the mobile communication device, an instruction on how to process the incoming telephone call from the smart television device; and
   processing, by the mobile communication device, the incoming telephone call based on the received instruction.

2. The method of claim 1, wherein pairing with the smart television device includes:
   requesting authentication information from the smart television device; and
   receiving the requested authentication information from the smart television device.

3. The method of claim 1, wherein the smart television device includes:
   a set top box;
   a television device;
   a gaming system; or
   a personal computer.

4. The method of claim 1, wherein detecting the smart television device includes:
   detecting the smart television device using a WiFi connection; or
   detecting the smart television device using a Bluetooth connection.

5. The method of claim 1, wherein detecting the smart television device includes:
   detecting that the mobile communication device is in a customer premises location;
   establishing a connection to a network terminal associated with the customer premises location;
   advertising the caller identification application associated with the mobile communication device via the network terminal; and
   receiving the request to pair with the mobile communication device from the smart television device via the network terminal.

6. The method of claim 1, wherein providing the caller identification information to the smart television device includes:
   obtaining an identifier associated with the smart television device; and
   sending a request to a network device configured to obtain the caller identification information for telephone calls to the mobile communication device, wherein the request includes the obtained identifier and a request to provide the caller identification information to the smart television device.

7. The method of claim 6, wherein receiving an instruction on how to process the incoming telephone call from the smart television device includes:
   receiving the instruction from the network device.

8. The method of claim 1, wherein receiving an instruction on how to process the incoming telephone call from the smart television device includes:
   receiving an instruction to answer the incoming telephone call; and
   wherein processing the incoming telephone call includes:
   playing a delay message to a calling party, wherein the delay message informs the calling party that the incoming telephone call will be answered after a particular period of time.

9. The method of claim 1, wherein receiving an instruction on how to process the incoming telephone call from the smart television device includes:
   receiving an instruction to answer the incoming telephone call and to stream the audio of the incoming telephone call to the smart television device; and
   wherein processing the incoming telephone call includes:
   answering the incoming telephone call and streaming the audio of the incoming telephone call to the smart television device.

10. The method of claim 1, wherein receiving an instruction on how to process the incoming telephone call from the smart television device includes:
    receiving an instruction to hand over the incoming telephone call to the smart television device; and
    wherein processing the incoming telephone call includes:
    handing the incoming telephone call over to the smart television device.

11. A method, performed by a set top box device, the method comprising:
    receiving, by the set top box device, an advertisement of a caller identification application from a mobile communication device;

pairing, by the set top box, with the mobile communication device, in response to receiving the advertisement;

receiving, by the set top box device, caller identification information associated with an incoming call to the mobile communication device based on the pairing;

generating, by the set top box, a user interface that includes the caller identification information and one or more options for responding to the incoming call associated with the caller identification information;

providing, by the set top box device, the generated user interface to a television to display to a user;

receiving, by the set top box device, a selection of one of the one or more options via a remote control associated with the television; and sending, by the set top box device, instructions to the mobile communication device on how to process the incoming call based on the received selection.

12. The method of claim 11, wherein receiving the caller identification information includes:

receiving the caller identification information from the mobile communication device over a WiFi connection or over a Bluetooth connection.

13. The method of claim 11, wherein receiving the caller identification information includes:

receiving the caller identification information from a network device configured to obtain the caller identification information for calls to the mobile communication device.

14. The method of claim 13, wherein sending the instructions to the mobile communication device on how to process the incoming call based on the received selection includes:

sending the instructions to the network device.

15. The method of claim 11, wherein pairing with the mobile communication device includes:

receiving a request for authentication information from the mobile communication device; and providing the requested authentication information to the mobile communication device.

16. The method of claim 11, wherein sending the instructions to the mobile communication device on how to process the incoming call based on the received selection includes:

sending a delay message to a calling party, wherein the delay message informs the calling party that the incoming call will be answered within a particular period of time;

answering the incoming call and streaming the audio of the incoming call to the television; or forwarding the incoming call over to the television.

17. A set top box device comprising:

logic configured to:

receive an advertisement of a caller identification application from a mobile communication device;

pair with the mobile communication device, in response to receiving the advertisement;

receive caller identification information associated with an incoming call to the mobile communication device based on the pairing;

generate a user interface that includes the caller identification information and one or more options for responding to the incoming call associated with the caller identification information;

provide the generated user interface to a television to display to a user;

receive a selection of one of the one or more options via a remote control associated with the television; and send instructions to the mobile communication device on how to process the incoming call based on the received selection.

18. The set top box device of claim 17, wherein the logic is further configured to:

receive the caller identification information from the mobile communication device over a WiFi connection or over a Bluetooth connection; or receive the caller identification information from a network device configured to obtain the caller identification information for calls to the mobile communication device.

19. The set top box device of claim 17, wherein, when pairing with the mobile communication device, the logic is further configured to:

receive a request for authentication information from the mobile communication device; and provide the requested authentication information to the mobile communication device.

20. The set top box device of claim 17, wherein the logic is further configured to:

send a delay message to a calling party, wherein the delay message informs the calling party that the incoming call will be answered within a particular period of time;

answer the incoming call and streaming the audio of the incoming call to the television; or forward the incoming call over to the television.

* * * * *